United States Patent
Shibata et al.

(10) Patent No.: US 8,404,401 B2
(45) Date of Patent: Mar. 26, 2013

(54) FUEL CELL HAVING IMPROVED CONTACT BETWEEN SEPARATORS AND GAS DIFFUSION LAYERS

(75) Inventors: Soichi Shibata, Osaka (JP); Hiroki Kusakabe, Osaka (JP); Kazuhito Hatoh, Osaka (JP)

(73) Assignee: Panasonic Corporation, Osaka (JP)

( * ) Notice: Subject to any disclaimer, the term of this patent is extended or adjusted under 35 U.S.C. 154(b) by 1055 days.

(21) Appl. No.: 11/920,003

(22) PCT Filed: May 9, 2006

(86) PCT No.: PCT/JP2006/309318
§ 371 (c)(1),
(2), (4) Date: Oct. 1, 2008

(87) PCT Pub. No.: WO2006/121041
PCT Pub. Date: Nov. 16, 2006

(65) Prior Publication Data
US 2009/0053573 A1 Feb. 26, 2009

(30) Foreign Application Priority Data

May 11, 2005 (JP) .................................. 2005-138387

(51) Int. Cl.
*H01M 4/02* (2006.01)
*H01M 8/10* (2006.01)
(52) U.S. Cl. .................... 429/534; 429/480; 429/481
(58) Field of Classification Search .................. 429/480, 429/481, 534
See application file for complete search history.

(56) References Cited

U.S. PATENT DOCUMENTS

2002/0187384 A1 12/2002 Kato et al.
2005/0084734 A1 4/2005 Kobayashi et al.

FOREIGN PATENT DOCUMENTS

| CA | 2 389 480 | 12/2002 |
|---|---|---|
| CA | 2 477 358 | 2/2005 |
| JP | 05-242897 | 9/1993 |

(Continued)

OTHER PUBLICATIONS http://www.merriam-webster.com/dictionary/on, Accessed on Nov. 8, 2011, An Encyclopedia Britannica Company.*

*Primary Examiner* — Barbara Gilliam
*Assistant Examiner* — Adam A Arciero
(74) *Attorney, Agent, or Firm* — McDermott Will & Emery LLP (57) ABSTRACT

The invention provides a fuel cell comprising one or more cells (102) stacked therein, each of the cells (102) including:

an MEA (4) having a polymer electrolyte membrane (7) and a pair of gas diffusion layers (5) sandwiching the polymer electrolyte membrane (7) except a peripheral region of the polymer electrolyte membrane (7); and a pair of self-sealing separators (1) disposed so as to sandwich the MEA (4), each of the self-sealing separators (1) being formed in a plate-like shape as a whole and composed of a separating part (41) having electrical conductivity and a sealing part (40) having more elasticity than the separating part (41), at least the separating part (41) being in contact with an associated one of the gas diffusion layers (5), the sealing part (40) being in contact with the peripheral region of the polymer electrolyte membrane (7) so as to enclose the associated one of the gas diffusion layers (5), wherein each self-sealing separator (1) has a lower area (11) for accommodating a raised portion (51) formed on the periphery of the outer surface of the associated gas diffusion layer (5) and the sealing part (40) is disposed within the lower area (11).

4 Claims, 10 Drawing Sheets

FOREIGN PATENT DOCUMENTS

| | | |
|---|---|---|
| JP | 06-325777 | 11/1994 |
| JP | 08-045517 | 2/1996 |
| JP | 2001-351651 | 12/2001 |
| JP | 2002-042838 | 2/2002 |
| JP | 2003-017087 | 1/2003 |
| JP | 2004-047230 | 2/2004 |
| JP | 2004-335453 | 11/2004 |

\* cited by examiner

FUEL CELL HAVING IMPROVED CONTACT BETWEEN SEPARATORS AND GAS DIFFUSION LAYERS

RELATED APPLICATIONS

This application is the U.S. National Phase under 35 U.S.C. §371 of International Application No. PCT/JP2006/309318, filed on May 9, 2006, which in turn claims the benefit of Japanese Application No. 2005-138387, filed on May 11, 2005, the disclosures of which Applications are incorporated by reference herein.

TECHNICAL FIELD

The present invention relates to a fuel cell well suited for use in portable power sources, electric vehicle batteries, domestic cogeneration systems and others. More particularly, the present invention relates to a fuel cell having a polymer electrolyte membrane.

BACKGROUND ART

Polymer electrolyte fuel cells are conventionally well known. Polymer electrolyte fuel cells include an anode and a cathode which consist of catalyst reaction layers and gas diffusion layers respectively and are arranged so as to hold a polymer electrolyte membrane therebetween. A hydrogen-containing fuel gas and an oxygen-containing oxidizing gas, such as air, (the fuel gas and oxidizing gas are hereinafter generically called as "reaction gases") are supplied to the anode and the cathode. In the anode, electrons are released from the hydrogen atoms contained in the fuel gas through an electrode reaction thereby generating hydrogen ions and these electrons reach the cathode by way of an external circuit (electric load). Meanwhile, the hydrogen ions reach the cathode after passing through the polymer electrolyte membrane. In the cathode, the hydrogen ions, the electrons and the oxygen contained in the oxidizing gas combine, so that water is generated. In the course of this reaction, electric power and heat are generated simultaneously.

The known fuel cell as explained herein has a "membrane electrode assembly (MEA)". The MEA is formed such that: a catalyst reaction layer containing, as a chief component, carbon powder that carries a metal having catalytic ability such as platinum is formed on both surfaces of a polymer electrolyte membrane that selectively transports hydrogen ions, and then a gas diffusion layer having fuel gas permeability and electron conductivity is formed on the outer surface of each catalyst reaction layer.

Figure 16:
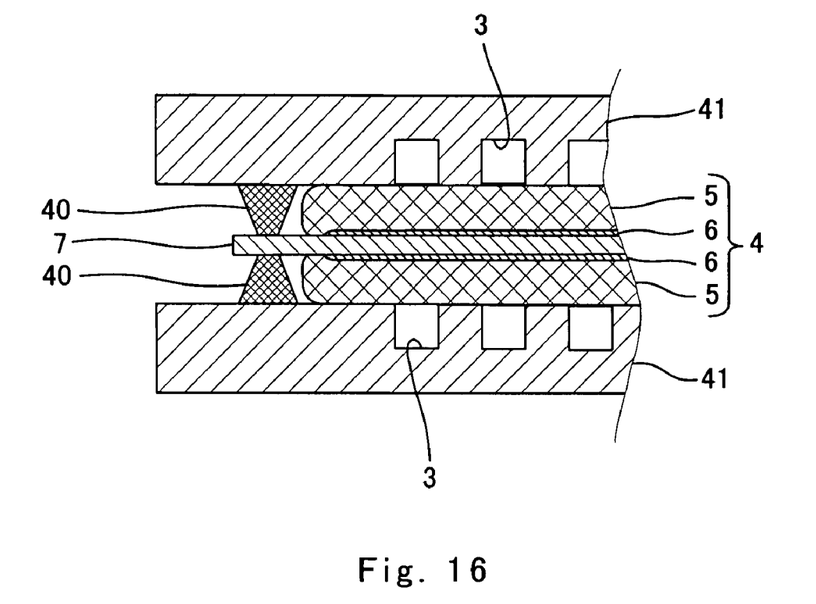
FIG. 16 is a fragmentary sectional view showing a cell used in a conventional fuel cell.

As illustrated in FIG. 16, the known fuel cell is provided with gaskets 40 that contact the peripheral region of the polymer electron membrane 7 so as to enclose the gas diffusion layers 5 and the catalyst layers 6 so that leakage of the supplied fuel gas and oxidizing gas to the outside and mixing of these gases are prevented. Further, this known fuel cell has electrically-conductive separators 41 that electrically serially connect adjacent MEAs 4 to each other. The MEA 4, the gaskets 40 and the separators 41 constitute a "cell".

In the area of each separator 41 where the separator 41 contacts its associated gas diffusion layer 5 of the MEA 4, a gas flow path 3 is provided for supplying the reaction gas to the anode and the cathode and carrying generated gas and redundant gas away. Although the gas flow path 3 may be provided separately from the separator 41, the gas flow path 3 is generally defined by a groove formed on a surface of the separator 41 and the gas diffusion layer 5.

Figure 17:
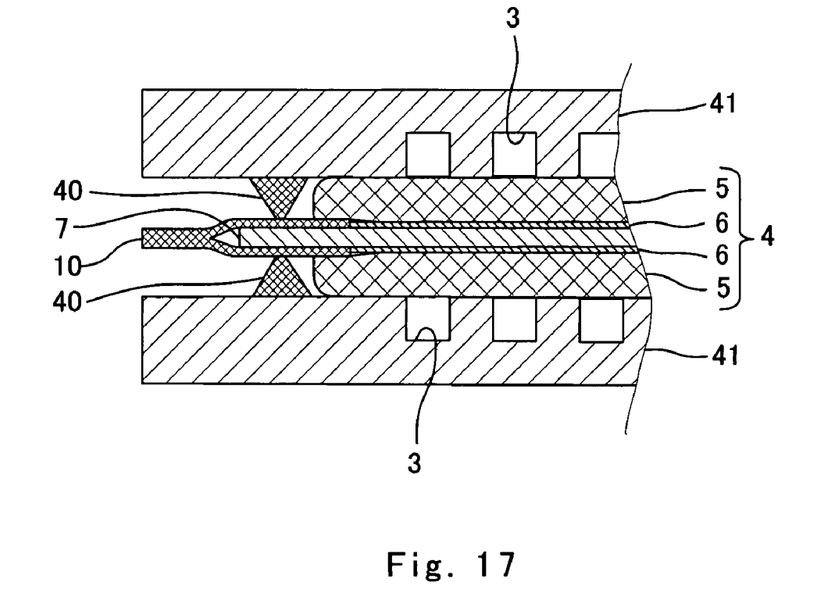
FIG. 17 is a fragmentary sectional view showing a cell used in another conventional fuel cell.

In the known fuel cell, since the mechanical strength of the polymer electrolyte membrane 7 is weak, a technique for reinforcing the peripheral region of the polymer electrolyte membrane 7 with a protective layer 10 as illustrated in FIG. 17 is employed (see Patent Documents 1, 2).

In the fuel cell described above, the MEA 4 needs to be uniformly pressurized by the separators 41. Non-uniform pressurization of the MEA 4 by the separators 41 causes such a phenomenon that some areas are strongly pressurized by the separators 41 whereas other areas are weakly pressurized.

In the areas of the MEA 4 strongly pressurized by the separators 41, local pressure concentration causes pin holes in the solid electrolyte membrane 7, because the solid electrolyte membrane 7 is poor in mechanical strength as discussed above.

In the areas of the MEA 4 weakly pressurized by the separators 41, the gas diffusion layer 5 and the separator 41 do not satisfactorily contact each other and therefore the contact area of the gas diffusion layer 5 and the separator 41 decreases as a whole with a drop in the voltage of generated power.

Figure 18:
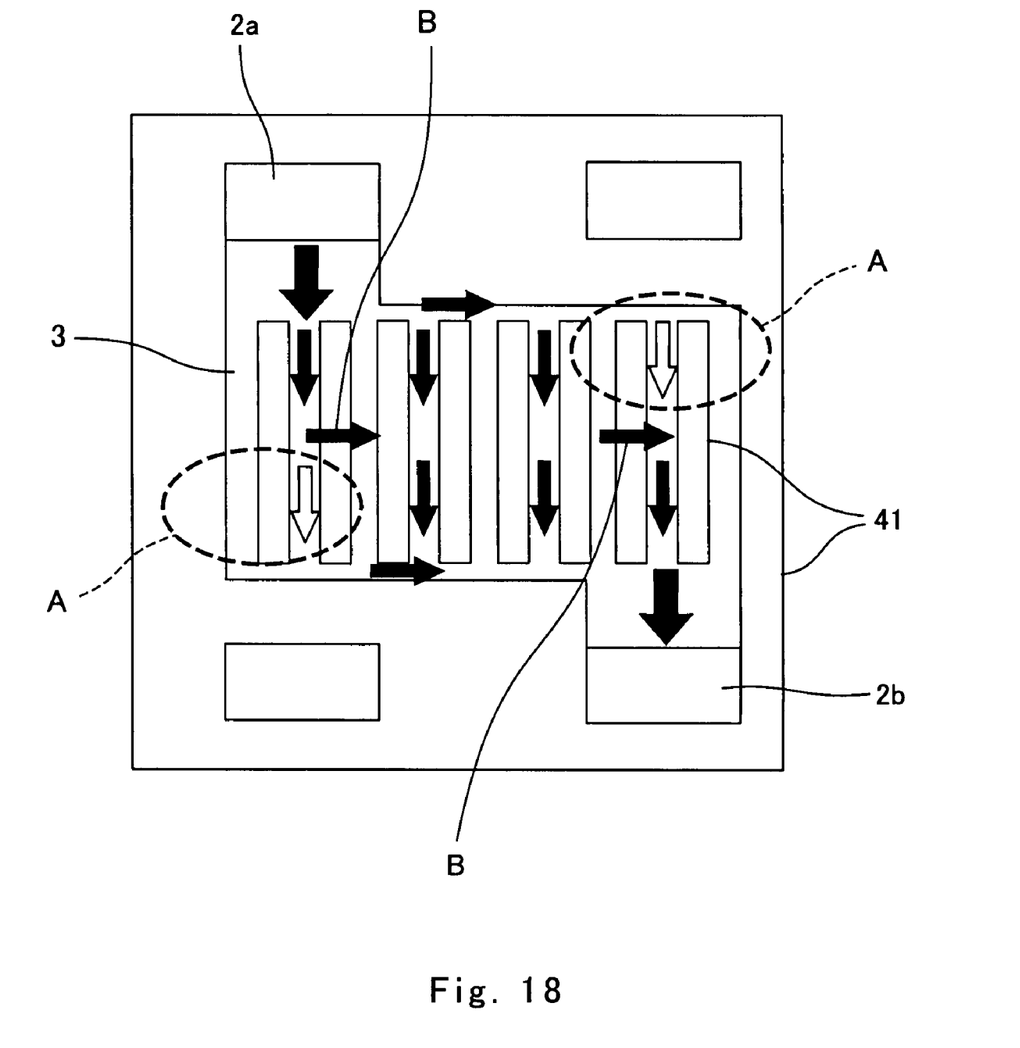
FIG. 18 is a pattern diagram showing a flow of reaction gas in the conventional fuel cells.

In addition, a gap is sometimes created between the separator 41 and the gas diffusion layer 5 in the areas of the MEA 4 weakly pressurized by the separators 41. The reaction gas supplied from a reaction gas feed manifold hole 2a is likely to pass through the gap (in the area indicated by B in FIG. 18) while traveling from the manifold hole 2a to a reaction gas discharge manifold hole 2b, so that the supplied reaction gas falls short in areas (indicated by A in FIG. 18) of the gas flow path 3. In the areas where the reaction gas is short, the polarization of the electrode reaction increases resulting in degradation of the performance of the fuel cell.

The general solid polymer electrolyte membrane 7 exhibits high ion conductivity in a wet condition and therefore, the reaction gases supplied to the gas flow paths 3 formed in the separators 41 are in a humidified condition. Further, the water produced by the electrode reaction makes the internal environment of the gas flow paths 3 more liable to generation of dew condensation water. To prevent the gas flow paths 3 from being clogged by the dew condensation water, the gas flow paths 3 of the conventional fuel cell are designed to be supplied with the reaction gas under enough pressure to remove the dew condensation water. However, in the areas of the gas flow paths 3 supplied with insufficient amounts of reaction gas, the capability of removing dew condensation water and, in consequence, the performance of the fuel cell decrease.

As an attempt to uniformly pressurize the gas diffusion layers 5 by the separators 41, the following measure is commonly taken in the fuel cells such as described above: the surface height of each separators 41 in contact with its associated gas diffusion layer 5 is made uniform, thereby making the contact surface of the separator 41 and gas diffusion layer 5 uniform.

Japanese Patent Document 1: Japanese Unexamined Patent Application Publication No. 5-242897 Japanese Patent Document 2: Japanese Unexamined Patent Application Publication No. 2004-47230

DISCLOSURE OF THE INVENTION

The Problems that the Invention Intends to Solve

The conventional fuel cells such as described above have revealed a problem that the separators are not in sufficiently uniform contact with their associated gas diffusion layers.

The invention is directed to overcoming the above problem and a primary object of the invention is therefore to provide a fuel cell in which the separators and their associated gas diffusion layers sufficiently uniformly contract each other.

Means for Solving the Problem

After making intensive researches with a view to solving the above program, the inventors have found that a cause of the non-uniform contact between the separators and the gas diffusion layers resides in the formation of raised portions in the peripheries of the outer surfaces of the gas diffusion layers in production of the gas diffusion layers. Generally, the gas diffusion layers are produced by cutting a piece of desired size out of large flat stock. However, a raised portion is created at the cut end of the gas diffusion layers during cutting process and therefore the gas diffusion layers do not have uniform thickness. The thickness of a gas diffusion layer more or less varies depending on the size and material of the gas diffusion layer. In fact, it has been found from measurements on the thickness of a cut carbon cloth (produced by Toray Industries, Inc. under the name of "CO6645B") that the periphery of a gas diffusion layer extending 1 mm inwardly from the cut end is 5% to 10% thicker than other areas. In cases where the peripheral region of the polymer electrolyte membrane is reinforced by a protective film as illustrated in FIG. 17, a larger-sized raised portion is created on the peripheries of the outer faces of the gas diffusion layers, which further increases the thickness of the peripheral region.

That is, the inventors have found that even if the surface height of the separators in contact with the gas diffusion layers are made uniform like the conventional fuel cells, the contact surfaces of the separators and the gas diffusion layers cannot be made uniform in cases where raised portions are formed on the peripheries of the outer surfaces of the gas diffusion layers.

It has become apparent that if a fuel cell, which uses gas diffusion layers thickened at their peripheries such as described above, is operated for a long period of time over 10,000 hours, the deterioration of the polymer electrolyte membrane will be accelerated. A possible cause of this is that the polymer electrolyte membrane is locally depressed by the peripheries of the gas diffusion layers.

To solve the above problem, the invention provides a fuel cell comprising one or more cells stacked therein, each of the cells including: an MEA having a polymer electrolyte membrane and a pair of gas diffusion layers sandwiching the polymer electrolyte membrane except a peripheral region of the polymer electrolyte membrane; and a pair of self-sealing separators disposed so as to sandwich the MEA, each of the self-sealing separators being formed in a plate-like shape as a whole and composed of a separating part having electrical conductivity and a sealing part having more elasticity than the separating part, at least the separating part being in contact with an associated one of the gas diffusion layers, the sealing part being in contact with the peripheral region of the polymer electrolyte membrane so as to enclose the associated one of the gas diffusion layers, wherein each self-sealing separator has a lower area for accommodating a raised portion formed on a periphery of an outer surface of the associated gas diffusion layer and the sealing part is disposed within the lower area.

In the above configuration, the raised portion formed in the periphery of the outer surface of each gas diffusion layer is received in the lower area of the associated one of the self-sealing separators, so that the separating part of the self-sealing separator and the gas diffusion layer can be brought into substantial uniform contact with each other. In addition, since the sealing part is disposed within the lower area, positioning of the sealing part and the separating part and, therefore, assembling of the fuel cell can be facilitated.

The lower area may have a groove that is formed in an inner surface of the self-sealing separator so as to accommodate the raised portion, and the sealing part may be disposed within the groove.

The lower area may have a stepped area that is formed in the inner surface of the self-sealing separator so as to be stepped down from the other area to accommodate the raised portion, and the sealing part may be disposed within the stepped area.

The lower area may have a groove formed in the inner surface of the self-sealing separator; the sealing part may be disposed within the groove; and the sealing part may comprise a convex part in contact with the peripheral region of the polymer electrolyte membrane of the MEA and an elastic film part that is formed in a film-like shape on a bottom face of an area of the groove where the convex part is not located and is elastically deformable to accommodate the raised portion.

According to the invention, there is provided a fuel cell comprising one or more cells stacked therein, each of the cells including: an MEA having a polymer electrolyte membrane and a pair of gas diffusion layers sandwiching the polymer electrolyte membrane except a peripheral region of the polymer electrolyte membrane; and a pair of self-sealing separators disposed so as to sandwich the MEA, each of the self-sealing separators being formed in a plate-like shape as a whole and composed of a separating part having electrical conductivity and a sealing part having more elasticity than the separating part, at least the separating part being in contact with an associated one of the gas diffusion layers, the sealing part being in contact with the peripheral region of the polymer electrolyte membrane so as to enclose the associated one of the gas diffusion layers, wherein each self-sealing separator has a lower area for accommodating a raised portion formed on a periphery of an outer surface of the associated gas diffusion layer, and the lower area has a groove formed in the inner surface of the self-sealing separator and an elastic film extending over the opening of the groove.

According to the invention, there is provided a fuel cell comprising one or more cells stacked therein, each of the cells including: an MEA having a polymer electrolyte membrane and a pair of gas diffusion layers sandwiching the polymer electrolyte membrane except a peripheral region of the polymer electrolyte membrane; and a pair of self-sealing separators disposed so as to sandwich the MEA, each of the self-sealing separators being formed in a plate-like shape as a whole and composed of a separating part having electrical conductivity and a sealing part having more elasticity than the separating part, at least the separating part being in contact with an associated one of the gas diffusion layers, the sealing part being in contact with the peripheral region of the polymer electrolyte membrane so as to enclose the associated one of the gas diffusion layers, wherein each self-sealing separator has a raised portion accommodating area for accommodating a raised portion formed on a periphery of an outer surface of the associated gas diffusion layer, and the raised portion accommodating area has a through hole formed in the inner surface of the self-sealing separator and an elastic filler that fills the through hole and is elastically deformable to accommodate the raised portion.

According to the invention, there is provided a fuel cell comprising one or more cells stacked therein, each of the cells including: an MEA having a polymer electrolyte membrane and a pair of gas diffusion layer sandwiching the polymer electrolyte membrane except a peripheral region of the polymer electrolyte membrane; and a pair of self-sealing separators disposed so as to sandwich the MEA, each of the self-sealing separators being formed in a plate-like shape as a whole and composed of a separating part having electrical conductivity and a sealing part having more elasticity than the separating part, at least the separating part being in contact with an associated one of the gas diffusion layers, the sealing part being in contact with the peripheral region of the polymer electrolyte membrane so as to enclose the associated one of the gas diffusion layers; wherein each self-sealing separator has a raised portion accommodating area for accommodating a raised portion formed on a periphery of an outer surface of the associated gas diffusion layer, each self-sealing separator has a first part and a second part, the first part being in contact with an area of the associated gas diffusion layer on the inner side of the area where the raised portion is formed and being constituted by the separating part, the second part being the area other than the first part and being constituted by the sealing part, and the raised portion accommodating area is constituted by the sealing part that is elastically deformable to accommodate the raised portion.

With such configuration, time and labor required for processing the parts of the fuel cell can be saved, resulting in an increase in the productivity of the fuel cell.

These objects as well as other objects, features and advantages of the invention will become apparent to those skilled in the art from the following detailed description of preferred embodiments with reference to the accompanying drawings.

Effects of the Invention

The invention is constructed as described above and therefore achieves the effect of providing substantial contact between a separating part of a self-sealing separator and a gas diffusion layer in a fuel cell.

EXPLANATION OF REFERENCE NUMERALS

1: self-sealing separator
2: manifold hole
2*a*: reaction gas feed manifold hole
2*b*: reaction gas discharge manifold hole
3: gas flow path
4: MEA
5: gas diffusion layer
6: catalyst layer
7: polymer electrolyte membrane
8: power collecting plate
9: end plate
10: protective film
11: raised portion accommodating area (lower area, groove, stepped down area)
11*a*: groove
12: elastic filler
12*a*: recessed part
13: elastic film
13*a*: recessed part
14: through hole
40: sealing part (gasket)
40*a*: convex part
40*b*: elastic film part
40*c*: plate peripheral part
40*d*: recessed part
41: separating part (separator)
51: raised portion
101: cell stack
102: cell
103: flow path forming region
A: gas lacking region
B: passing-through reaction gas

BEST MODE FOR CARRYING OUT THE INVENTION

Figure 1:
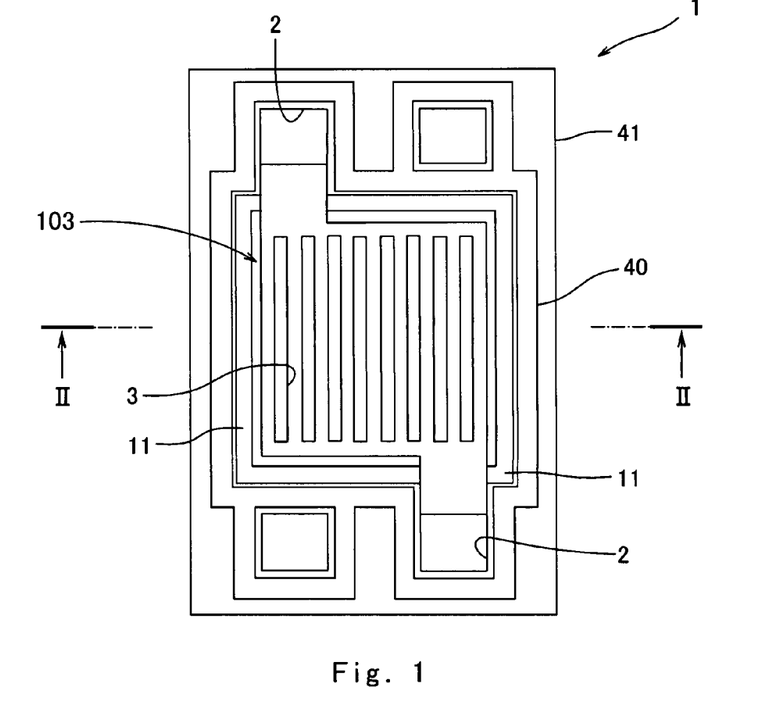
FIG. 1 is a plan view showing the configuration of a separator for use in a fuel cell according to a first embodiment of the invention.
Figure 2:
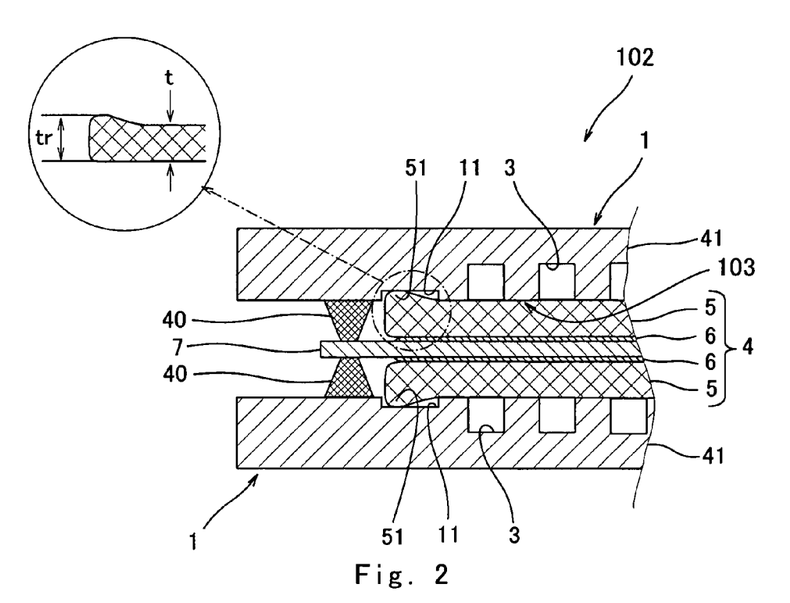
FIG. 2 is a fragmentary sectional view that shows a cell used in the fuel cell of the first embodiment of the invention when cut so as to cut the separator along line II-II of FIG. 1.
Figure 3:
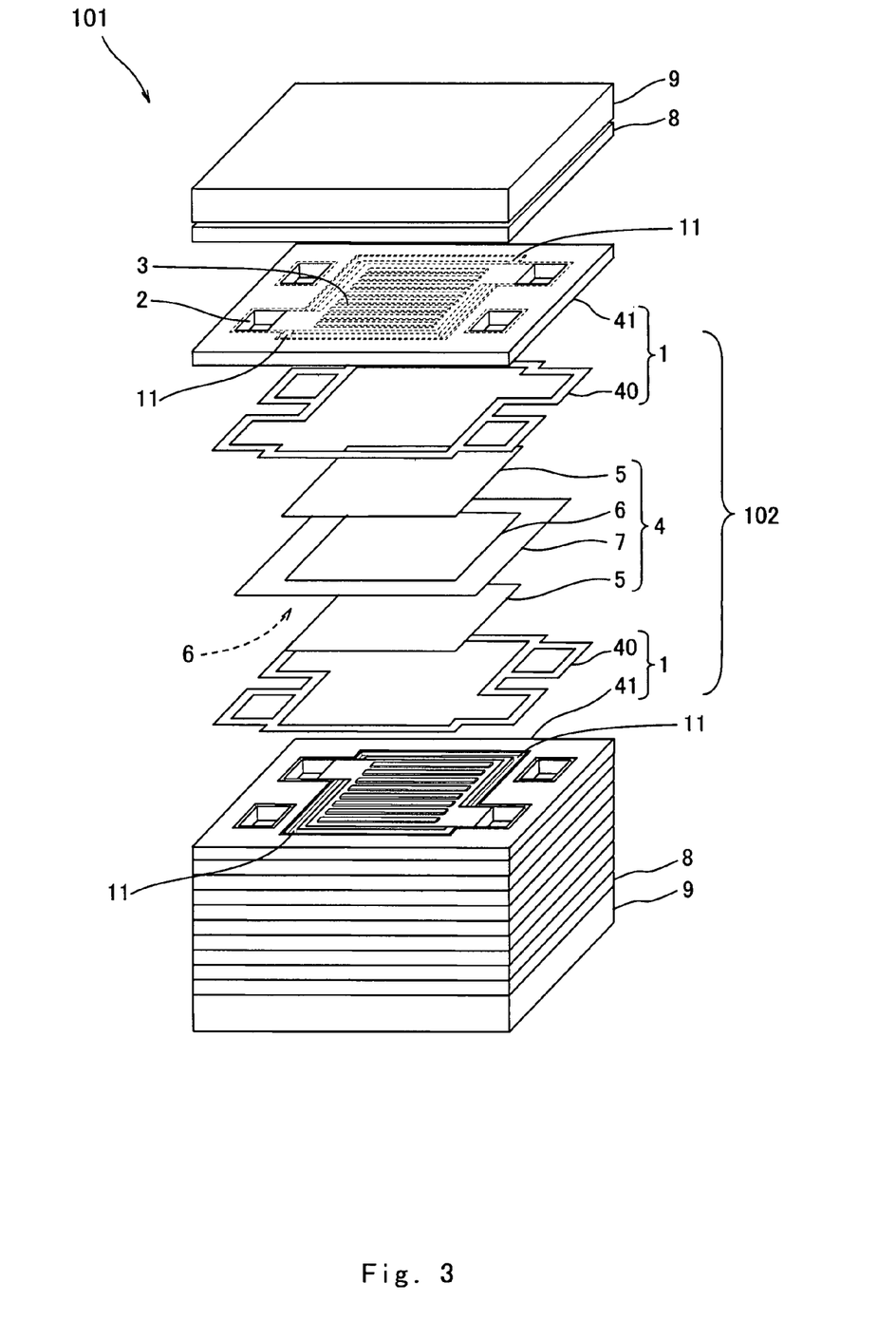
FIG. 3 is an exploded perspective view showing the configuration of the fuel cell of the first embodiment of the invention.

Referring now to the accompanying drawings, embodiments of the invention will be described below.
(First Embodiment)
FIG. 1 is a plan view showing the configuration of a separator for use in a fuel cell according to a first embodiment of the invention. FIG. 2 is a fragmentary sectional view that shows the configuration of a cell used in the fuel cell of the first embodiment of the invention when cut so as to cut the separator along line II-II of FIG. 1. FIG. 3 is an exploded perspective view showing the configuration of the fuel cell of the first embodiment of the invention.

As illustrated in FIGS. 1, 2, the fuel cell of the first embodiment is equipped with self-sealing separators 1. Each of the self-sealing separators 1 has a separating part 41 and a sealing part 40 formed in the separating part 41. The separating part 41 corresponds to a so-called separator and has the shape of a rectangular plate. One (hereinafter referred to as "inner surface") of the main surfaces of the separating part 41 is provided with the sealing part 40 constituted by an ordinary sealing member (which is a gasket herein). In the invention, the separator having the sealing member, in other words, the separator and the sealing member formed in the separator are generically called the "self-sealing separator 1", the part corresponding to a separator is called the "separating part 41", and the part corresponding to a sealing member is called the "sealing part 40".

A pair of self-sealing separators 1 is provided for every cell 102 (described later). First, a first one of the self-sealing separators 1 will be explained.

The separating part 41 of the first self-sealing separator 1 may be formed from an electrically conductive sheet material having rigidity. For instance, the separating part 41 may be manufactured with a method in which a gas flow path 3 (described later) is formed on a surface of a glassy carbon plate by cutting work. Alternatively, the separating part 41 may be formed by hot compression molding, transfer molding or injection molding of a conductive carbon material (e.g., natural graphite and artificial graphite) to which a thermoplastic resin (e.g., polyethylene and polyvinyl alcohol) or thermoset resin (e.g., phenol resin and epoxy resin) has been added as a binder. Such molding processes are performed at temperatures that do not cause graphitization of the resin (i.e., thermoplastic resin or thermoset resin). It is also possible to produce the separating part 41 by pressing a metal sheet (e.g., stainless steel, gold plated copper, iron). In the peripheral region of the separating part 41, two pairs of manifold holes 2 are formed so as to pass through the separating part 41 in a thickness-wise direction thereof in order that two kinds of reaction gases (fuel gas and oxidizing gas) are supplied and discharged therethrough. A flow path (hereinafter referred to as "gas flow path") 3 is so formed as to connect the manifold holes 2 of a first pair to flow one of the reaction gases. The most part of the gas flow path 3 is formed in a specified region (hereinafter referred to as "flow path forming region") 103 that excludes the periphery of the inner surface of the separating part 41. The flow path forming region 103 is a region with which a gas diffusion layer 5 of an MEA 4 except a raised portion 51 comes into contact as described later when the self-sealing separator 1 is incorporated into the cell 102. The gas flow path 3 is constituted by a groove formed in the inner surface of the separating part 41 and has many branch flow paths.

A raised portion accommodating area 11 is formed so as to surround the flow path forming region 103. The raised portion accommodating area 11 is constituted by a groove that is a lower area formed in the inner surface of the separating part 41. The definition of the lower area as stated in the invention includes a groove (the second, third, fifth and seventh embodiments) and a stepped down area (the sixth embodiment). The raised portion accommodating area 11 is the area where the raised portion 51 of the gas diffusion layer 5 of the MEA 4 is positioned when the self-sealing separator 1 is incorporated into the cell 102 as described later. The raised portion 51 is formed in the peripheral region of the gas diffusion layer 5 so as to have an annular shape. The raised portion accommodating area 11 has such a width and depth that the raised portion 51 can be accommodated in the raised portion accommodating area 11 when the flow path forming region 103 of the separating part 41 is in contact with the gas diffusion layer 5 except the raised portion 51. Since the raised portion accommodating area 11 is shallower than the gas flow path 3, the raised portion accommodating area 11 is blocked off by the gas flow path 3 located between the flow path forming region 103 and the manifold holes 2 (the raised portion accommodating area 11 is not formed in the gas flow path 3). The raised portion accommodating area 11 may be formed by forming or injection molding as a part of the separating part 41. Alternatively, the raised portion accommodating area 11 may be formed by cutting the separating part 41 after formation of the separating part 41. The depth of the groove of the raised portion accommodating area 11 should be optimally designed according to the material, dimension and processing accuracy of the gas diffusion layer and should be equal to or higher than the value obtained by the following equation.

$$\text{Depth of groove} = (t_r - t \times \beta) \times \alpha$$

Herein, $t_r$ is the thickness of the raised portion 51 of the gas diffusion layer 5 and t is the thickness of the portion excluding the raised portion 51 (see FIG. 2). $\beta$ is the compression rate of the gas diffusion layer 5 when fastened (i.e., the compression rate of the gas diffusion layer 5 when assembled in the cell stack), $\alpha$ is the coefficient (safety coefficient) determined dependently on the tolerances of the separating part 41 and the gas diffusion layer 5.

The sealing part 40 is formed so as to extend around the raised portion accommodating area 11 and the two pairs of manifold holes 2. The sealing part 40 encloses a second pair of manifold holes 2. The sealing part 40 has such a height that the sealing part 40 is able to come into contact with the peripheral region of the polymer electrolyte membrane 7 of the MEA 4 when the self-sealing separator 1 is incorporated into the cell 102. The sealing part 40 is formed such that a sealing member made of a material having greater elasticity than the separating part 41 is inserted into a groove (not shown) formed in the inner surface of the separating part 41. The sealing material of the sealing part 40 is not limited to any particular materials as long as the operational effect of the invention can be achieved by it. Preferable examples of the sealing material of the sealing part 40 include: fluoro rubber; silicon rubber, natural rubber; ethylene-propylene rubber (EPDM); butyl rubber; butyl chloride rubber; butyl bromide rubber; butadiene rubber; styrene-butadiene copolymer; ethylene-vinylacetate rubber; acrylic rubber; polyisopropylene polymer; perfluorocarbon; thermoplastic elastomer (e.g., polystyrene-based elastomer, polyolefin-based elastomer; polyester-based elastomer; and polyamide-based elastomer); adhesives containing latex (e.g., isoprene rubber; and butadiene rubber); and liquid adhesives (e.g., adhesives containing polybutadiene; polyisoprene; polychloroprene; silicon rubber; fluorocarbon rubber; and acrylonitrile-butadiene rubber). As the material of the sealing part 40, one of the above sealing materials may be used alone. Alternatively, two or more may be used in combination or in composite form.

The sealing part 40 may be formed by properly adding additives such as fire retardant and plasticizer to the above sealing materials, thereby attaining improvements in desired properties such as fire retardancy and plasticity.

The fire retardant applicable to the invention is not limited to any particular agents as long as the operational effect of the invention can be attained by it. Preferable examples of the fire retardant include: chlorinated paraffin; perchlorocyclodecane; chlorendic acid; phosphate ester; phosphonate; phospholinen; chlorinated phosphate ester; chlorinated diphosphate; brominated phosphate ester; tetrabromophthalic anhydride; polydibromophenylene oxide; polytetrabromostyrene; hexabromocyclododecane; melamine phosphate dimelamine phosphate; and ammonium polyphosphate.

The plasticizer applicable to the invention is not limited to any particular agents as long as the operational effect of the invention can be attained by it. Preferable examples of the plasticizer include: phthalic ester; dioctyl adipate; diisononyl adipate; trimellitic ester; pyromellitic ester; and biphenyltetracarboxylic ester.

Next, a second one of the self-sealing separators 1 will be described. This self-sealing separator 1 is provided with another gas flow path 3 that is formed so as to connect the manifold holes 2 of a second pair, for flowing the other reaction gas. The sealing part 40 of this separator 1 does not enclose the second pair of manifold holes 2 but encloses the first pair of manifold holes 2. Except this point, the second self-sealing separator 1 does not differ from the first self-sealing separator 1 described earlier.

The surfaces of the pair of self-sealing separators 2, which surfaces each have the flow path forming region 103 formed thereon, sandwich the MEA 4, forming the cell 102. The MEA 4 is made of a known material and has been described earlier in the column of "Background Art". Therefore, a detailed explanation of it will be omitted. The MEA 4 is constructed by stacking the catalyst layer 6 and the gas diffusion layer 5 on each surface of the polymer electrolyte membrane 7 except the peripheral region. The raised portions 51 attributable to the processing method are formed on the peripheries of the gas diffusion layers 5. The gas diffusion layers 5 are made of materials having air permeability and electron conductivity. Examples of such materials include fabric cloth (e.g., carbon cloth), nonwoven cloth, paper, punching metal, steel wool, and combinations of punching metal and steel wool. The diffusion layers 5 are preferably made of an elastic material.

In the cell 102, the diffusion layers 5 of the MEA 4 are in contact with the flow path forming regions 103, respectively, of the self-sealing separators 1 except the raised portions 51. Thereby, the reaction gases flowing in the gas flow paths 3 are supplied to the electrodes (the gas diffusion layers 5 and the catalyst layers 6), respectively. The raised portions 51 of the gas diffusion layers 5 are accommodated in the raised portion accommodating areas 11 of the self-sealing separators 1. The leading end of the sealing part 40 of each self-sealing separator 1 is in contact with the peripheral region of the polymer electrolyte membrane 7 of the MEA 4. Thereby, leakage of the reaction gases to the outside and mixing of the two kinds of reaction gases can be prevented.

As illustrated in FIG. 3, a plurality of cells 102 are stacked in a thickness-wise direction thereof and each end of the stack of cells 102 is provided with a power collecting plate 8, an insulating plate (not shown) and an end plate 9. Fastening bolts (not shown), which pass through bolt insertion holes (not shown) formed in the cells 102, the power collecting plates 8, the insulating plates and the end plates 9, are fixedly held by nuts. Thus, a cell stack 101 is formed. The fastening power of the fastening bolts is set to a specified value. In the cell stack 101, the manifold holes 2 formed in one self-sealing separator 1 are connected to their corresponding manifold holes 2 in the other self-sealing separator 1 respectively, so that manifolds are formed. Each reaction gas is supplied from the outside of the cell stack 101 to its corresponding manifold on the supply side and discharged to the outside of the cell stack 101 through its corresponding manifold on the discharge side, after passing through its corresponding gas flow path 3. In this course, each reaction gas is supplied to its corresponding electrode of each cell 102, causing a chemical reaction to generate electric power and heat. The redundant reaction gases, which have not been used in the chemical reactions, flow out to their respective manifolds on the discharge side.

Next, the operational effect of the fuel cell thus configured will be described.

In the fuel cell of the first embodiment, the raised portion accommodating area 11 is formed on the inner surface of each self-sealing separator 1 and the raised portion 51 of each gas diffusion layer 5 of the MEA 4 is accommodated in its corresponding raised portion accommodating area 11, so that pressure from the self-sealing separator 1 is not imposed on the raised portion 51. Therefore, the separating part 41 of the self-sealing separator 1 and the gas diffusion layer 5 of the MEA 4 can be brought into substantially uniform contact with each other. As a result, the cell performance of the fuel cell as well as its service life can be improved.

[Modification]

Through holes may be formed in the separating parts 41 as the raised portion accommodating areas 11 in place of the above-described grooves. The same effect as of the first embodiment described earlier can be achieved with this configuration.

(Second Embodiment)

Figure 4:
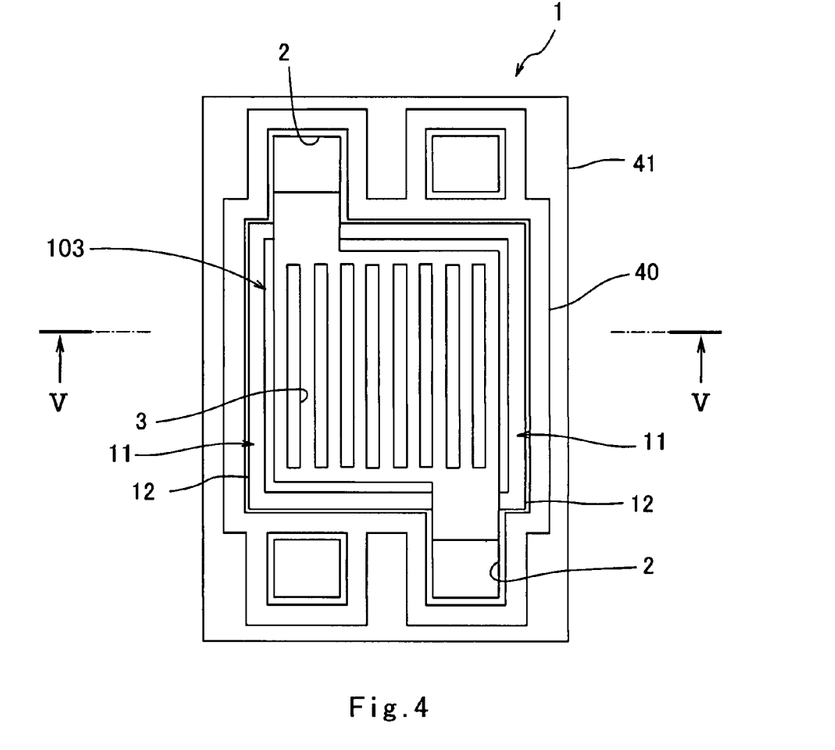
FIG. 4 is a plan view showing the configuration of a separator for use in a fuel cell according to a second embodiment of the invention.
Figure 5:
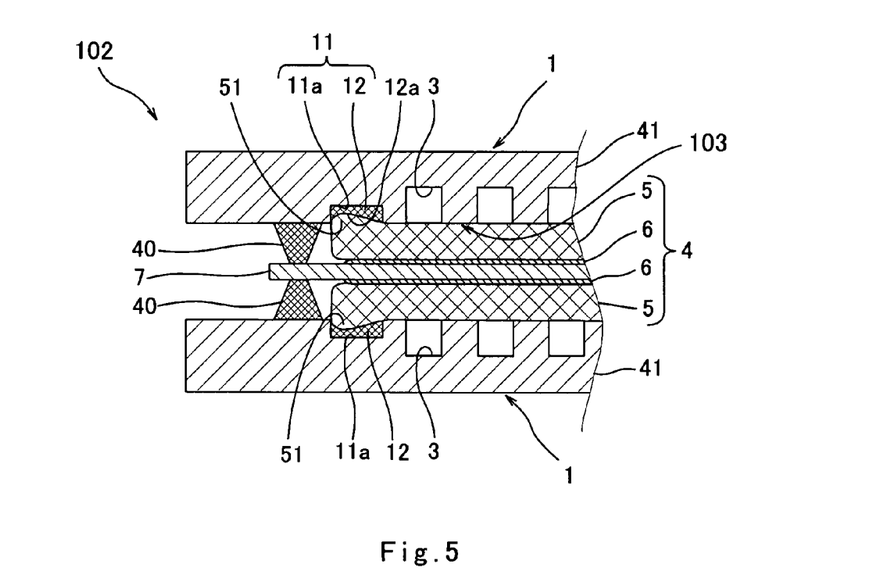
FIG. 5 is a fragmentary sectional view that shows a cell used in the fuel cell of the second embodiment of the invention when cut so as to cut the separator along line V-V of FIG. 4.

FIG. 4 is a plan view showing the configuration of a separator for use in a fuel cell according to a second embodiment of the invention. FIG. 5 is a fragmentary sectional view that shows a cell used in the fuel cell of the second embodiment of the invention when cut so as to cut the separator along line V-V of FIG. 4. In FIGS. 4, 5, those parts similar or corresponding to the parts of FIGS. 1, 2 are identified by the same reference numerals and explanations thereof are omitted herein.

As illustrated in FIGS. 4, 5, in the second embodiment, a groove (lower area) 11a corresponding to the groove that constitutes the raised portion accommodating area 11 of the first embodiment and an elastic filler 12 filling the groove 11a constitute the raised portion accommodating area 11. Formed on the surface of the elastic filler 12 is a recessed part 12a. The recessed part 12a is shaped so as to just receive the raised portion 51 of the gas diffusion layer 5 of the MEA 4. In other words, the recessed part 12 has an inner surface shape corresponding to the outer surface shape of the raised portion 51. Except this point, the second embodiment does not differ from the first embodiment.

More concretely, the raised portion accommodating area 11 of the second embodiment is formed in the following way: After forming the groove 11a on the inner surface of the separating part 41 of the self-sealing separator 1, the groove 11a is filled with an elastic material to form the elastic filler 12 during which the surface of the elastic filler 12 is shaped so as to substantially correspond to the outer surface shape of the raised portion 51 of the gas diffusion layer 5 of the MEA 4, using dies or the like. In this case, it is desirable that the depth of the recessed part 12a be slightly less than the projecting height of the raised portion 51 of the gas diffusion layer 5. In doing so, in the cell 102, the raised portion 51 comes into press contact with the elastic filler 12 which, in turn, elastically shrinks, so that the recessed part 12a is formed on the surface of the elastic filler 12 so as to fit the raised portion 51.

Although the elastic filler 12 is made of a rubber material such as fluoro rubber, silicon rubber or ethylene-propylene rubber (EPDM); a resin material; or a liquid material such as an adhesive, the material of the elastic filler 12 is not limited to a particular material as long as it is deformed when depressed by the raised portion 51 of the gas diffusion layer 5.

Next, the operational effect of the fuel cell thus configured will be explained.

When the cells 102 of the fuel cell of the second embodiment are assembled, that is, when the inner surface of each self-sealing separator 1 is brought into contact with its corresponding gas diffusion layer 5 of the MEA 4, the raised portion 51 of the gas diffusion layer 5 comes into contact with the surface of the elastic filler 12 of the raised portion accommodating area 11, forming the recessed part 12a on the elastic filler 12 such that the recessed part 12a has a shape just conforming to the raised portion 51. This makes the elastic filler 12 and the raised portion 51 of the gas diffusion layer 5 contact each other without leaving a clearance therebetween, so that the reaction gas can be prevented from leaking to the groove 11a from the raised portion 51 of the gas diffusion layer 5 having air permeability.

[Modification]

The elastic filler 12 may be formed by pouring a liquid elastic material into the groove 11a after making the self-sealing separator 1 and the gas diffusion layer 5 of the MEA 4 contact each other and then hardening the material. This process has the same effect as of the technique described earlier.

Further, the elastic filler 12 may be formed from a substantially soft material without forming the recessed part 12a beforehand. Specifically, the groove 11a is completely filled with the elastic filler 12 such that the surface of the elastic filler 12 becomes flat. In this case, the raised portion 51 comes into contact with the flat surface of the elastic filler 12 in the cell 102, so that the flat surface falls in, creating a recess in the elastic filler 12 which recess has a shape just conforming to the raised portion 51. Then, the raised portion 51 gets into the recess. As just described, the raised portion accommodating area 11 of the fuel cell of the invention receives the raised portion 51 of the gas diffusion layer 5 when the cells 102 are in an assembled condition. The same effect as of the configuration described earlier can be achieved with this configuration.

(Third Embodiment)

Figure 6:
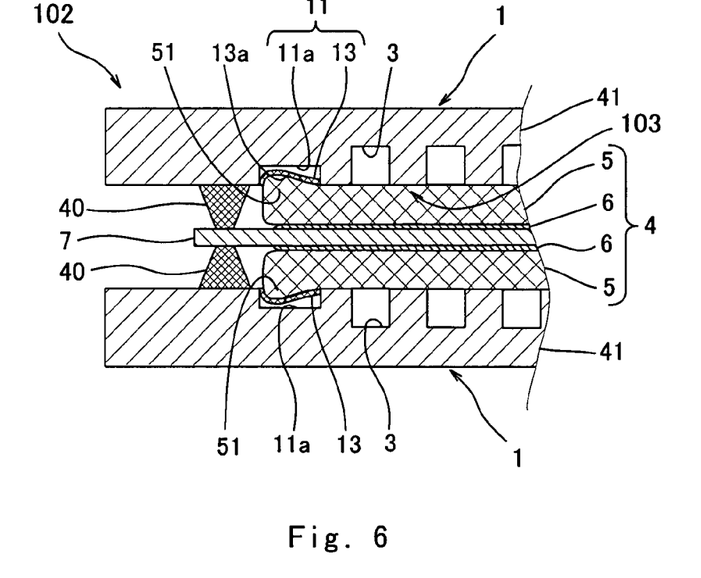
FIG. 6 is a fragmentary sectional view showing a cell used in a fuel cell according to a third embodiment of the invention.

FIG. 6 is a fragmentary sectional view that shows a cell used in a fuel cell according to a third embodiment of the invention. In FIG. 6, those parts similar or corresponding to the parts of FIG. 5 are identified by the same reference numerals and explanations thereof are omitted herein.

As illustrated in FIG. 6, in the third embodiment, the raised portion accommodating area 11 of each self-sealing separator 1 is constituted by the groove (lower area) 11a that is the same as that in the second embodiment and an elastic film 13 that is formed so as to extend over the opening of the groove 11a. Although the elastic film 13 is made of a rubber material such as fluoro rubber, silicon rubber or ethylene-propylene rubber (EPDM), the material of the elastic film 13 is not limited to any particular material as long as it is deformed when depressed by the raised portion 51 of the gas diffusion layer 5. Except this point, the third embodiment does not differ from the second embodiment.

Next, the operational effect of the fuel cell thus configured will be described below.

In the third embodiment, the raised portion accommodating area 11 of each self-sealing separator 1 is formed such that the elastic film 13 extends over the opening of the groove 11a.

This elastic film 13 takes the form of a flat sheet when it is in a free condition. When the cells 102 are brought into an assembled condition, that is, when the inner surface of each self-sealing separator 1 is brought into contact with the gas diffusion layer 5 of the MEA 4, the raised portion 51 of the gas diffusion layer 5 comes into contact with the elastic film 13, causing the elastic film 13 to be deformed along the outer surface of the raised portion 51. Thereby, a recessed part 13a, which has a shape just conforming to the raised portion 51, is formed on the outer surface side of the elastic film 13 and the raised portion 51 is accommodated in the recessed part 13a. Since the elastic film 13 and the raised portion 51 of the gas diffusion layer 5 contact each other without leaving a clearance therebetween, the reaction gas can be prevented from leaking to the groove 11a from the raised portion 51 of the gas diffusion layer 5 having air permeability.

(Fourth Embodiment)

Figure 7:
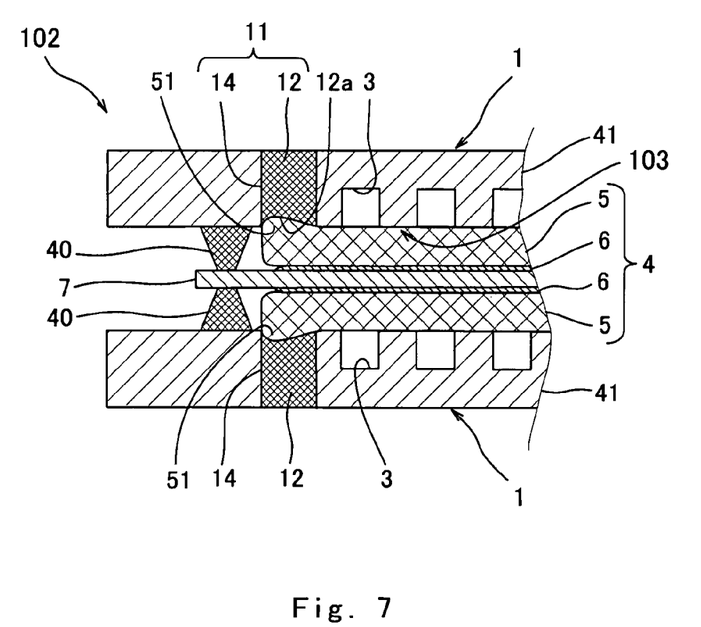
FIG. 7 is a fragmentary sectional view showing a cell used in a fuel cell according to a fourth embodiment of the invention.

FIG. 7 is a fragmentary sectional view showing a cell used in a fuel cell according to a fourth embodiment of the invention. In FIG. 7, those parts similar or corresponding to the parts of FIG. 5 are identified by the same reference numerals and explanations thereof are omitted herein.

As illustrated in FIG. 7, the fourth embodiment has a through hole 14 in place of the groove 11a of the second embodiment. This through hole 14 has the same planar shape as of the groove 11a of the second embodiment and passes through the separating part 41 of each self-sealing separator 1 in a thickness-wise direction thereof. In this embodiment, the elastic filler 12 is so formed as to fill the through hole 14. This through hole 14 and the elastic filler 12 constitute the raised portion accommodating area 11. Formed on the surface of the elastic filler 12 is the recessed part 12a that is the same as that in the second embodiment. Except this point, the fourth embodiment does not differ from the second embodiment.

Next, the operational effect of the fuel cell thus configured will be described below.

According to the fuel cell of the fourth embodiment, when the cells 102 are in an assembled condition, the raised portion 51 of the gas diffusion layer 5 is in contact with the surface of the elastic filler 12 of the raised portion accommodating area 11 and the recessed part 12a having a shape corresponding to the raised portion 51 is formed on the surface of the elastic filler 12. Since the elastic filler 12 and the raised portion 51 of the gas diffusion layer 5 contact each other without leaving a clearance therebetween, the reaction gas can be prevented from leaking to the groove 11a from the raised portion 51 of the gas diffusion layer 5 having air permeability.

(Fifth Embodiment)

Figure 8:
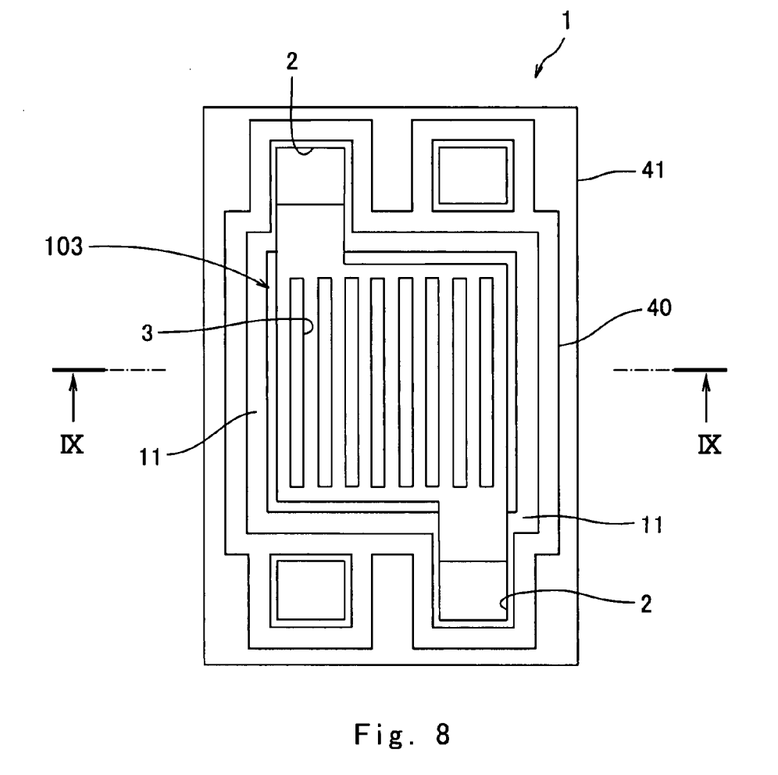
FIG. 8 is a plan view showing the configuration of a separator for use in a fuel cell according to a fifth embodiment of the invention.
Figure 9:
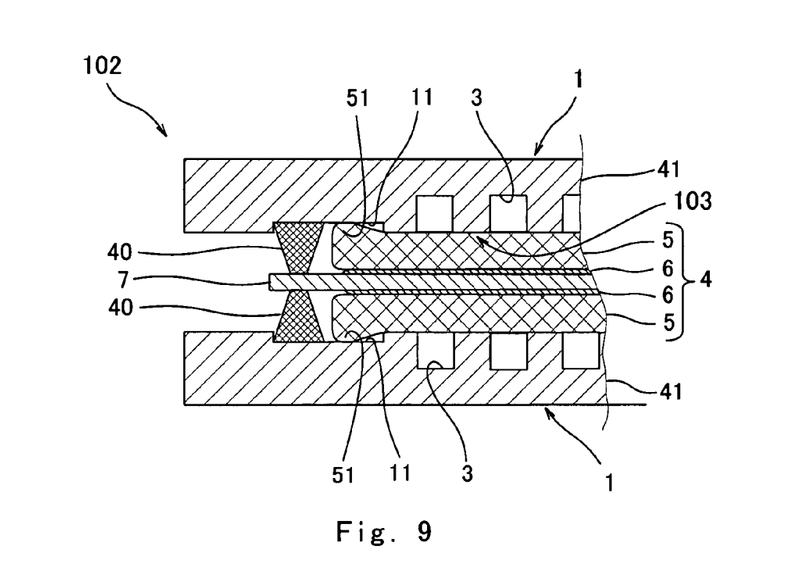
FIG. 9 is a fragmentary sectional view showing a cell used in the fuel cell of the fifth embodiment of the invention when cut so as to cut the separator along line IX-IX of FIG. 8.

FIG. 8 is a plan view showing the configuration of a separator for use in a fuel cell according to a fifth embodiment of the invention. FIG. 9 is a fragmentary sectional view showing a cell used in the fuel cell of the fifth embodiment of the invention when cut so as to cut the separator along line IX-IX of FIG. 8. In FIGS. 8 and 9, those parts similar or corresponding to the parts of FIGS. 1 and 2 are identified by the same reference numerals and explanations thereof are omitted herein.

As illustrated in FIGS. 8, 9, in the fifth embodiment, the raised portion accommodating area 11 of each self-sealing separator 1 is constituted by a groove formed in the inner surface of the separating part 41. This groove is so wide that it includes the area where the sealing part 40 of the first embodiment is formed. The sealing part 40 is formed within this groove (lower area). In this groove, the region excluding the area where the sealing part 40 is formed has enough width and depth to accommodate the raised portion 51 of the gas diffusion layer 5 when the flow path forming region 103 of the separating part 41 is in contact with the gas diffusion layer 5 except the raised portion 51. Except this point, the fifth embodiment does not differ from the first embodiment.

Next, the operational effect of the fuel cell thus configured will be described below.

According to the fuel cell of the fifth embodiment, since the raised portion accommodating area 11 is configured to have enough width to accommodate the raised portion 51 and the sealing part 40, the sealing part 40 can be disposed so as to extend along the outer periphery of the inner surface of the raised portion accommodating area 11. As a result, positioning of the sealing part 40 and the separating part 41 and, therefore, assembling of the fuel cell can be facilitated.

(Sixth Embodiment)

Figure 10:
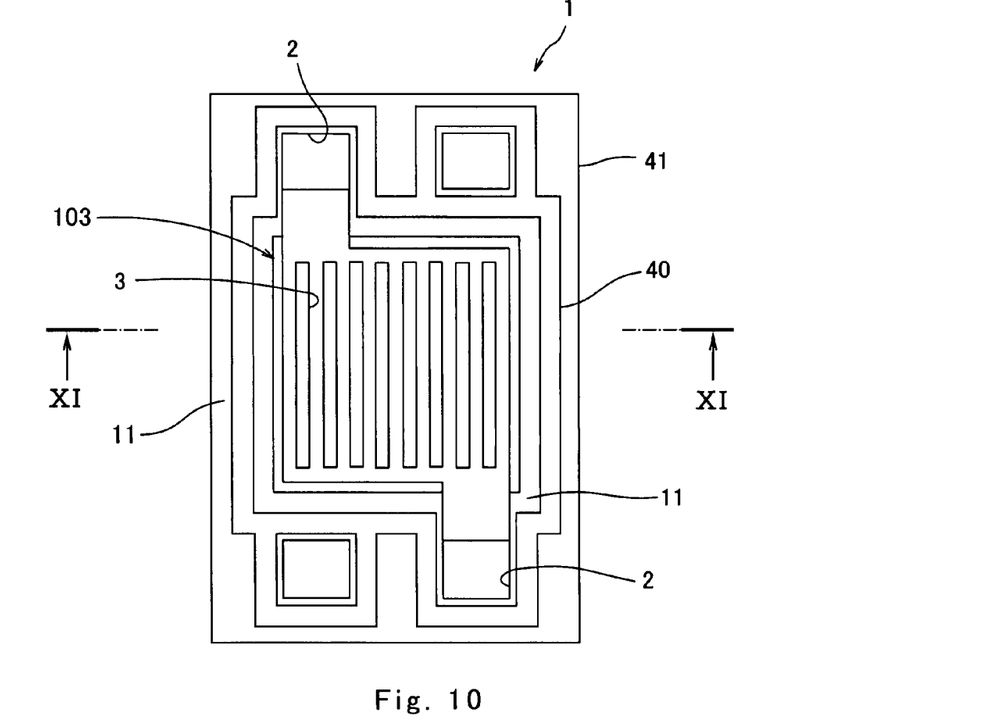
FIG. 10 is a plan view showing the configuration of a separator for use in a fuel cell according to a sixth embodiment of the invention.
Figure 11:
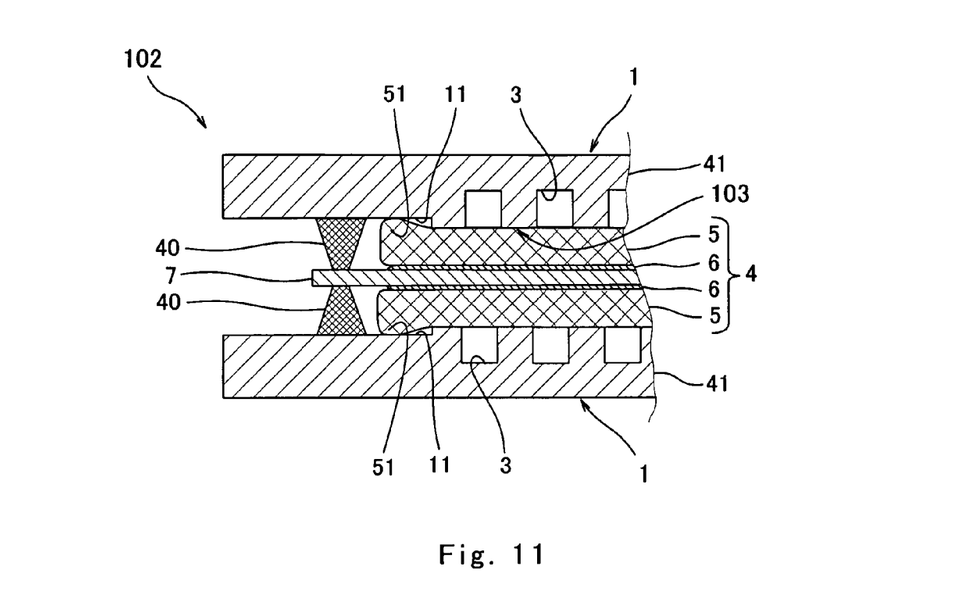
FIG. 11 is a fragmentary sectional view showing a cell used in the fuel cell of the sixth embodiment of the invention when cut so as to cut the separator along line XI-XI of FIG. 10.

FIG. 10 is a plan view showing the configuration of a separator for use in a fuel cell according to a sixth embodiment of the invention. FIG. 11 is a fragmentary sectional view showing a cell used in the fuel cell of the sixth embodiment of the invention when cut so as to cut the separator along line XI-XI of FIG. 10. In FIGS. 10 and 11, those parts similar or corresponding to the parts of FIGS. 1 and 2 are identified by the same reference numerals and explanations thereof are omitted herein.

As illustrated in FIGS. 10, 11, in the sixth embodiment, the raised portion accommodating area 11 of each self-sealing separator 1 is constituted by a stepped down area (lower area) that encloses the flow path forming region 103 formed on the inner surface of the separating part 41 and is stepped down from the flow path forming region 103 (more specifically, the area of the region 103 where the reaction gas flow path 3 is not formed). The sealing part 40 is formed in the stepped down area. The level difference between the stepped down area and the flow path forming region 103 is determined similarly to the determination on the depth of the groove of the raised portion accommodating area 11 of the first embodiment. The region of the stepped down area that is located on the inner side of the sealing part 40 is configured to have enough width to accommodate the raised portion 51 when the flow path forming region 103 of the separating part 41 is in contact with the region of the gas diffusion layer 5 excluding the raised portion 51. Except this point, the sixth embodiment does not differ from the first embodiment.

With the above configuration, the same effect as of the fuel cell of the first embodiment can be achieved.

(Seventh Embodiment)

Figure 12:
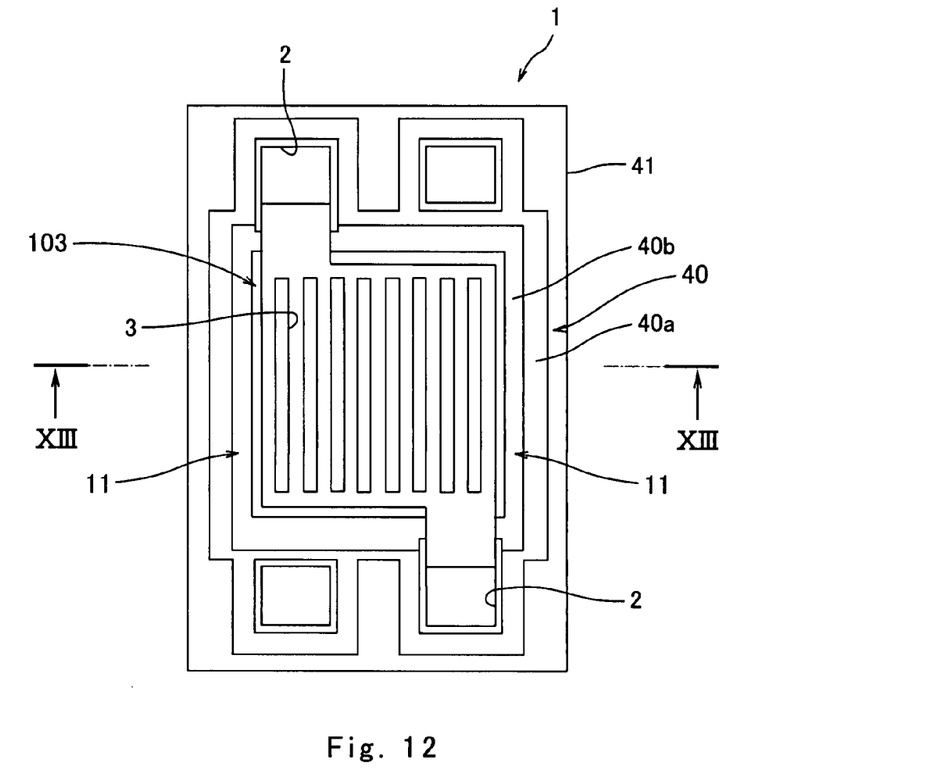
FIG. 12 is a plan view showing the configuration of a separator for use in a fuel cell according to a seventh embodiment of the invention.
Figure 13:
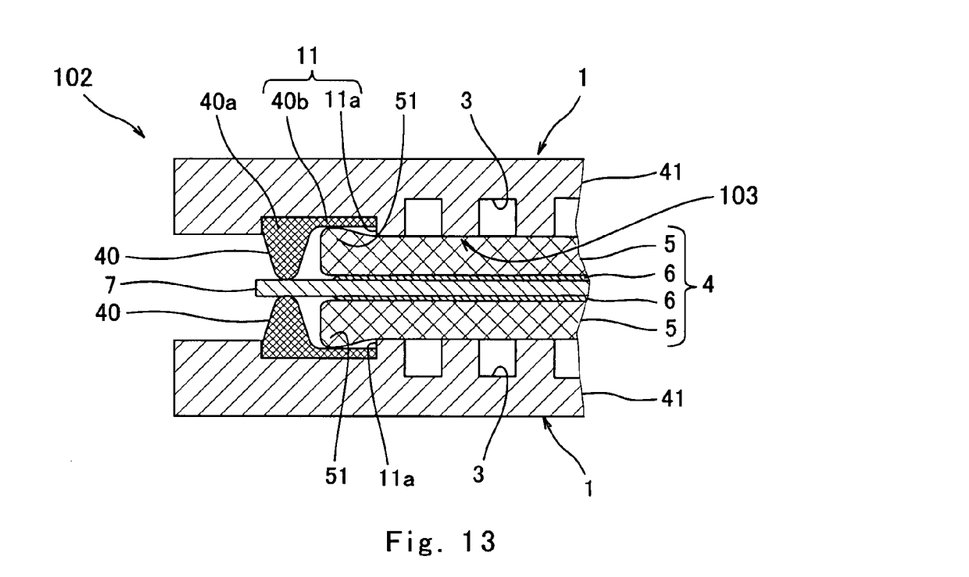
FIG. 13 is a fragmentary sectional view showing a cell used in the fuel cell of the seventh embodiment of the invention when cut so as to cut the separator along line XIII-XIII of FIG. 12.

FIG. 12 is a plan view showing the configuration of a separator for use in a fuel cell according to a seventh embodiment of the invention. FIG. 13 is a fragmentary sectional view showing a cell used in the fuel cell of the seventh embodiment of the invention when cut so as to cut the separator along line XIII-XIII of FIG. 12. In FIGS. 12 and 13, those parts similar or corresponding to the parts of FIGS. 8 and 9 are identified by the same reference numerals and explanations thereof are omitted herein.

As seen from FIGS. 12, 13, the seventh embodiment is a modification of the fifth embodiment and configured such that the sealing part 40 extends over the entire area of the groove (lower area) 11a of the fifth embodiment. The sealing part 40 of the seventh embodiment is constituted by a convex part 40a and an elastic film part 40b. The convex part 40a (that is in contact with the polymer electrolyte membrane 7 of the MEA 4 when the cells 102 are in an assembled condition) corresponds to the sealing part 40 of the fifth embodiment, whereas the elastic film part 40b is formed in the shape of a film on the bottom face of the region of the groove 11a where the convex part 40a is not located. The elastic film part 40b is made of the same elastic material as of the convex part 40a and integrally formed with the convex part 40a. The elastic film part 40b has a specified thickness. This specified thickness is such that when the raised portion 51 of the gas diffusion layer 5 of the MEA 4 comes into contact with the surface of the elastic film part 40b for example when assembling the cells 102, the elastic film part 40b sinks in to a high enough degree to accommodate the raised portion 51. This specified thickness is determined by experiments or the like. The groove 11a of the seventh embodiment is deeper than the groove 11a of the fifth embodiment by the thickness of the elastic film part 40b. The raised portion accommodating area 11 of the seventh embodiment is made up of the groove 11a and the elastic film part 40b.

Next, the operational effect of the fuel cell thus configured will be described below.

According to the fuel cell of the seventh embodiment, the raised portion accommodating area 11 of each self-sealing separator 1 is formed such that the sealing part 40 composed of the convex part 40a and the elastic film part 40b is formed within the groove 11a. The elastic film part 40b extends over the bottom face of the region of the groove 11a where the convex part 40a is not located. The raised portion 51 of the gas diffusion layer 5 is in contact with the elastic film part 40b, so that the leakage of the reaction gas from the raised portion 51 can be reduced.

(Eighth Embodiment)

Figure 14:
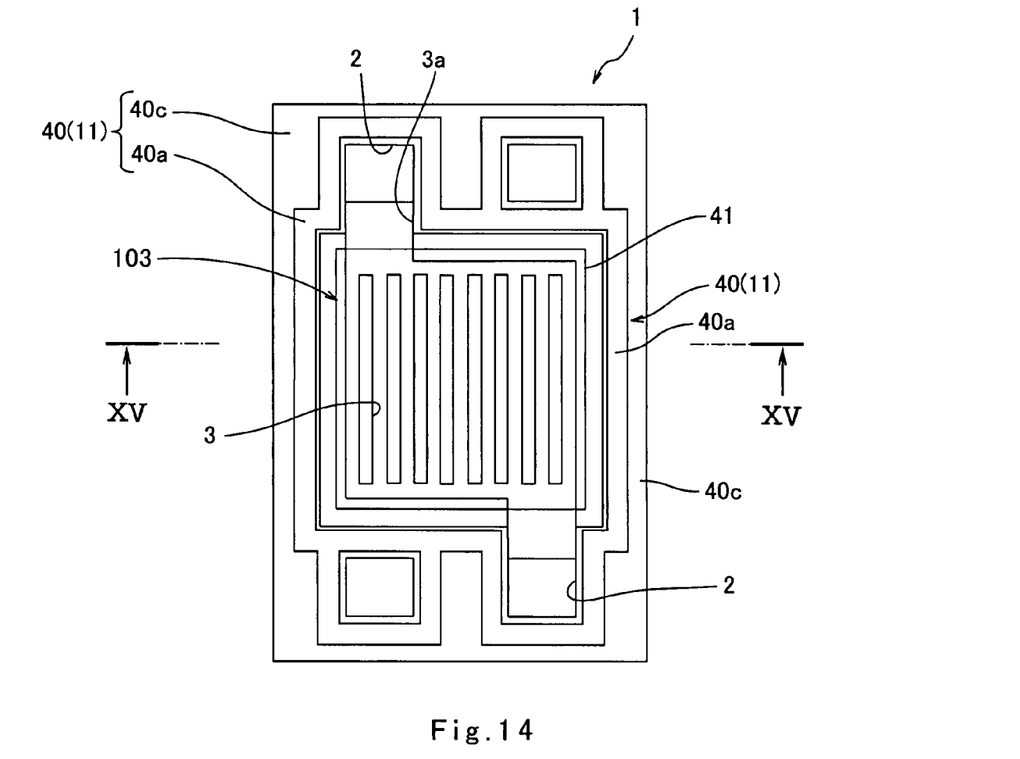
FIG. 14 is a plan view showing the configuration of a separator for use in a fuel cell according to an eighth embodiment of the invention.
Figure 15:
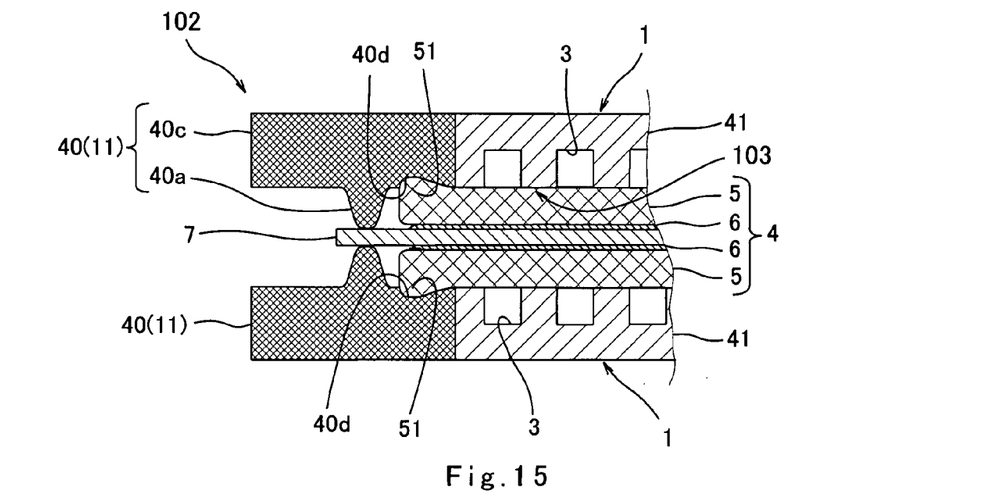
FIG. 15 is a fragmentary sectional view showing a cell used in the fuel cell of the eighth embodiment of the invention when cut so as to cut the separator along line XV-XV of FIG. 14.

FIG. 14 is a plan view showing the configuration of a separator for use in a fuel cell according to an eighth embodiment of the invention. FIG. 15 is a fragmentary sectional view showing a cell used in the fuel cell of the eighth embodiment of the invention when cut so as to cut the separator along line XV-XV of FIG. 14. In FIGS. 14 and 15, those parts similar or corresponding to the parts of FIGS. 4 and 5 are identified by the same reference numerals and explanations thereof are omitted herein.

The eighth embodiment is a modification of the second embodiment. In the second embodiment, the self-sealing separators 1 are each composed of a plate-like portion (that corresponds to a typical separator and is hereinafter referred to as "plate portion") which functions to separate adjacent MEAs 4 in the cell stack 101 from each other and a projecting portion (hereinafter referred to as "convex portion") that projects from the inner surface of the plate portion, coming into contact with the peripheral region of the MEA 4 to thereby prevent leakage of the reaction gas. In the second embodiment, the entire plate portion is constituted by the separating part 41 whereas the convex portion is constituted by the sealing part 40. In contrast with this, the eighth embodiment is formed as follows (see FIGS. 14, 15). Of the plate portion of the self-sealing separator 1, only the part having the flow path forming region 103 (a first part) is substantially constituted by the separating part 41 and the remaining part (a second part), that is, the peripheral part (hereinafter referred to as "plate periphery part") surrounding the part having the flow path forming region 103 is constituted by the sealing part 40. Accordingly, the sealing part 40 is constituted by the plate periphery part 40c and the convex part 40a formed so as to project from the inner surface of the plate periphery part 40c and these parts 40c and 40a are integrally formed. Formed in the plate periphery part 40c are the manifold holes 2 and connection parts 3a of the gas flow path 3. The connection parts 3a connect the manifold holes 2, respectively, to the portion of the gas flow path 3 located in the flow path forming region 103. In the inner surface of the plate periphery part 40c, a recessed part 40d is formed at a position similar to the position of the recessed part 12a of the elastic filler 12 of the second embodiment and has a shape similar to the recessed part 12a. The recessed part 40d accommodates the raised portion 51 of the gas diffusion layer 5. In the eighth embodiment, the sealing part 40 (more specifically, the plate periphery part 40c) constitutes the raised portion accommodating area 11. The sealing part 40 and the separating part 41 are integrally formed, for instance, by coinjection molding process. Except the points described above, the eighth embodiment does not differ from the second embodiment.

Next, the operational effect of the fuel cell thus configured will be described below.

According to the fuel cell of the eighth embodiment, in a state where the cells 102 are assembled, that is, in a state where the inner surface of each self-sealing separator 1 is in contact with its corresponding gas diffusion layer 5 of the MEA 4, the inner surface of the recessed part 40d of the plate periphery part 40c is depressed by the raised portion 51 of the gas diffusion layer 5, so that it slightly sinks in, taking a shape that matches with the raised portion 51. Accordingly, the plate periphery part 40c and the raised portion 51 of the gas diffusion layer 5 come into contact with each other without leaving a clearance therebetween. As a result, the reaction gas can be prevented from leaking to the groove 11a from the raised portion 51 of the gas diffusion layer 5 having air permeability. In addition, the self-sealing separator 1 having the separating part 41 and the sealing part 40 which are made of different materials can be easily produced in an integral fashion by means of, for instance, coinjection molding, so that time and labor required for processing the parts of the fuel cell can be saved, resulting in an increase in the productivity of the fuel cell.

[Modification]

The eighth embodiment may be modified similarly to the modification of the second embodiment. Specifically, the sealing part 40 may be made of a substantially soft material without forming the recessed part 40d beforehand. That is, the plate periphery part 40c of the sealing part 40 is formed so as to have a flat surface except the area where the convex part 40a is formed. In this case, the raised portion 51 comes into contact with the flat surface of the plate periphery part 40c in the cell 102, so that the flat surface falls in, creating the recessed part 40d in the plate periphery part 40c which recessed part 40d has a shape just conforming to the raised portion 51 and the raised portion 51 gets into the recessed part 40d. With this configuration, the same effect as of the configuration described earlier can be achieved.

The foregoing embodiments include not only cases where the raised portion 51 located in the periphery of the outer surface of each gas diffusion layer 5 is created when the gas diffusion layer 5 is produced by cutting, but also cases where the raised portion 51 is created owing to the pressure generated when the MEA 4 having the gas diffusion layers 5 which have no raised portion at the time of cutting is assembled into the cell stack 101.

Numerous modifications and alternative embodiments of the invention will be apparent to those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention.

INDUSTRIAL APPLICABILITY

The fuel cell of the invention is a useful fuel cell in which the separators are in substantially uniform contact with their corresponding gas diffusion layers.

The invention claimed is:

1. A fuel cell comprising one or more cells stacked therein, each of said cells comprising:
    an MEA having a polymer electrolyte membrane and a pair of gas diffusion layers sandwiching said polymer electrolyte membrane except a peripheral region of said polymer electrolyte membrane; and
    a pair of self-sealing separators disposed so as to sandwich said MEA in a manner to be in contact with each of said gas diffusion layers, each of said self-sealing separators being composed of a plate-shaped separating part having electrical conductivity and a sealing part having more elasticity than said separating part, said sealing part being in contact with the peripheral region of said polymer electrolyte membrane so as to enclose an associated one of said gas diffusion layers,
    wherein a raised portion raised toward said separating part is formed on a periphery of said associated one of said gas diffusion layers, the raised portion and the gas diffusion layer being formed integrally and being formed of the same material, and
    wherein said self-sealing separator has formed therein a lower area for accommodating said raised portion formed on the periphery of an outer surface of said associated gas diffusion layer, said sealing part being disposed within said lower area.

2. The fuel cell according to claim 1, wherein said lower area is a groove that is formed in an inner surface of said self-sealing separator so as to accommodate said raised portion, and wherein said sealing part is disposed within said groove.

3. The fuel cell according to claim 1, wherein said lower area is a stepped area that is formed in the inner surface of said self-sealing separator so as to be stepped down from the other area to accommodate said raised portion, and wherein said sealing part is disposed within said stepped area.

4. The fuel cell according to claim 1, wherein said lower area is a groove formed in the inner surface of said self-sealing separator, said sealing part is disposed within said groove, and said sealing part comprises a convex part in contact with the peripheral region of said polymer electrolyte membrane of said MEA and an elastic film part that is formed in a film-like shape on a bottom face of an area of said groove where said convex part is not located and is elastically deformable to accommodate said raised portion.

* * * * *